April 10, 1951 H. C. STAEHLE 2,548,565
METHOD OF MAKING RELIEF PRINTING PLATES
Filed July 10, 1948
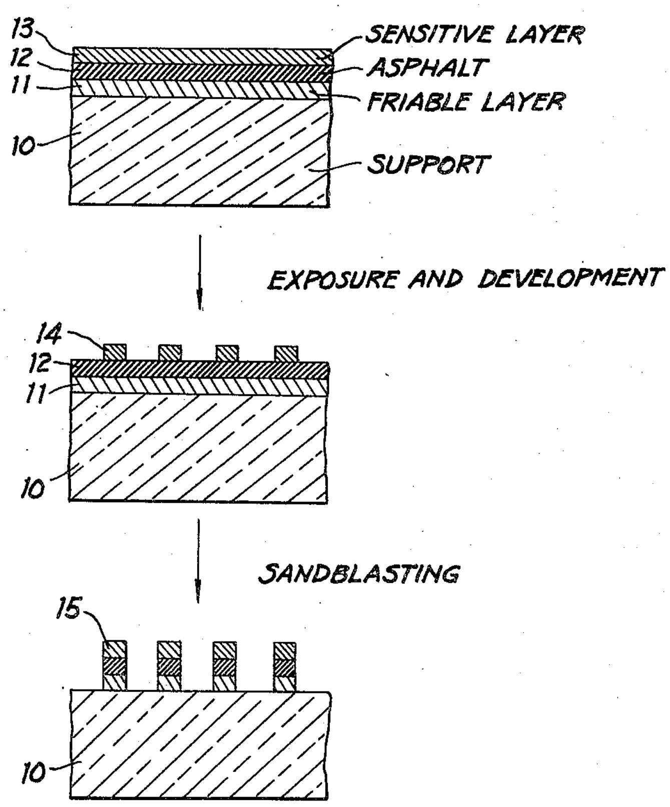
HENRY C. STAEHLE
INVENTOR
BY Newton M. Perrins
R. Frank Smith
ATTORNEYS Patented Apr. 10, 1951

2,548,565

UNITED STATES PATENT OFFICE 2,548,565

METHOD OF MAKING RELIEF PRINTING PLATES

Henry C. Staehle, Rochester, N. Y., assignor to Eastman Kodak Company, Rochester, N. Y., a corporation of New Jersey Application July 10, 1948, Serial No. 38,082

4 Claims. (Cl. 95—5.6)

This application relates to photography and particularly to a photographic method of making relief printing plates for photomechanical use.

The conventional method of preparing photoengraving plates by acid etching requires careful control and frequent "staging" in order to obtain adequate depth for printing and at the same time to maintain highlight dot structure.

It has been proposed to etch the printing plates by use of a sand blast but this is generally unsatisfactory for high relief images because the gelatin or other material of the resist is not sufficiently resistant to the action of the sand blast. It has also been proposed to coat a support with asphalt and a layer of bichromated gelatin in which a relief image is formed and then remove the asphalt with turpentine and subject the support to a sand blast for the formation of a relief image in the support.

I have found that a relief image suitable for use in the preparation of printing plates or electros may be made by coating a support with a layer of a friable material followed by a layer of asphalt and a layer of light-sensitive gelatin or glue. After formation of a relief image in the gelatin or glue by exposure and washing away unhardened portions of the gelatin or glue in the customary manner, the asphalt and friable material are subjected to the action of a sand blast to remove the asphalt and friable material where the gelatin or glue has been washed away. This forms a deep relief from which a duplicate can be made by conventional electrotyping processes.

The accompanying drawing shows in sectional view the material at various stages in my process.

It has long been recognized that certain substances such as plaster of Paris, rosin, compacted and dried but unfired clay, synthetic resins such as a hard, brittle coumarone resin and other substances are very rapidly attacked by the action of a sand blast. Such substances therefore are useful in obtaining a high relief with a minimum of sand blasting and particularly with a delicate resist which will tolerate only a limited amount of sand blasting. In order to make a printing plate for line work where a relief of the order of 0.2 inch is required, a material which sand blasts more readily than asphalt is almost essential with the resists which have been developed at the present time. The friable materials referred to above may be used according to my invention but I have found that a coating containing barium sulfate with binder in the ratio of 20 parts of barium sulfate to one part of binder is especially suitable as a friable material. Another material which sand blasts very well and has good strength is a mixture of two parts of dry plaster of Paris with one part of ordinary rosin. These friable materials are coated on a support according to my invention followed by a layer of asphalt and a layer of light-sensitive gelatin or glue such as the usual bichromated glue or a bichromated gelatin containing a dispersion of a soft, acrylate resin such as described in my copending application Serial No. 558,346.

After exposure of the sensitive layer to light and formation of a relief image in the sensitive layer by washing away soluble portions of the gelatin, the asphalt and friable material are removed where the gelatin has been removed by a light sand blasting operation. This leaves a relief image which may be used for the formation of a high relief printing plate by taking an impression and electro-plating the relief in the well-known manner.

My invention will be illustrated by the following specific example.

A support of a suitable material such as glass, cellulose ester or metal is coated with a layer of barium sulfate from a solution of the following composition:

| | Parts |
|---|---|
| Solvent | 17.68 |
| Cellulose acetate butyrate | 0.78 |
| Terpene resin | 3.14 |
| Barium sulfate | 78.20 |
| Dibutyl phthalate | 0.20 |

In this composition, the solvent consists of 76 parts of propylene dichloride, 19 parts methyl alcohol and 5 parts Cellosolve (ethylene glycol monoethyl ether).

The cellulose acetate butyrate has an acetyl content of approximately 12.5 to 13.5% and a butyryl content of about 37%. It has a viscosity of 20 to 30 centipoises at a 10% concentration in acetone.

The terpene resin is an isomerized terpene phenolic oil-soluble thermoplastic resin having a melting point of 212 to 230° F. and an acid number of 95 to 105.

It will be seen that the ratio of pigment to binder in the composition is about 20 to 1. The ratio of pigment to binder represents a compromise between material having a high strength which is obtained by using less barium sulfate pigment, and a material which sand blasts extremely fast, that is, one which contains virtually no binder. The above-described mixture sand blasts moderately rapidly and yet the resulting relief image has adequate strength for the making of conventional electros.

To the layer of friable barium sulfate there is applied a layer of asphalt as a 60% solution in toluene. This is followed by a bichromated gelatin or glue layer such as a layer of bichromated gelatin containing a dispersion of a soft acrylate resin as described in my prior application, Ser. No. 558,346.

Another material which sand blasts very well and has good strength is a mixture of two parts of dry plaster of Paris with one part of an ordinary grade of rosin. These are added just above the melting point of the rosin and coated in a layer of appropriate thickness.

After the application of the asphalt layer, it is sometimes preferable to apply a primer layer of nitrocellulose, plasticized alkyl resin or rosin-modified maleic resin in butyl acetate, toluene, butyl alcohol, ethyl alcohol, ethyl acetate, Cellosolve, toluene, xylene, etc., before application of the sensitive layer such as the bichromated glue layer containing a dispersion of a soft, acrylate resin as described in my prior application Ser. No. 558,346.

The asphalt layer serves several purposes. In addition to forming a base for the sensitive layer, it serves to increase the thickness of the coating and therefore the depth of the relief and also because it is black, it serves to guide the progress of the sand blasting operation.

I also propose to prepare the pigment coating such as the barium sulfate, in several layers of different colors so as to indicate the depth of etching. For example, the required relief for 133-line halftones is of the order of .003 inch to .004 inch while that for line work is of the order of .020 inch. By coating first a layer of say .016 inch of one color followed by a layer of 0.004 inch of a contrasting color of the friable material followed by the asphalt and light-sensitive resist layers, a light sand blasting just through the top friable layer would be adequate for halftone work while for line work a deeper cut would be required. These can be followed easily by virtue of the contrasting colors of the layers of friable material.

My invention will now be illustrated by reference to the accompanying drawing.

As shown in the drawing, a support 10 of any suitable material such as glass, paper, or cellulose ester is coated with a layer 11 of friable material, a layer 12 of asphalt, and a sensitive layer 13 which may be a bichromated glue. After exposure of the element to a suitable line image and washing away the unhardened parts of the layer with hot water, an image 14 is produced as shown in the second stage of the drawing. The element is subjected to a sand blast treatment to remove those portions of the asphalt layer 12 and friable layer 11 underneath the parts of the sensitive layer which have been washed away, leaving a high relief image 15 as shown in the third stage of the drawing.

While I have described the use of both an asphalt layer and a layer of friable material in my invention, it is possible in certain cases to omit the asphalt layer.

It will be understood that the examples and modifications included herein are illustrative only and that my invention is to be taken as limited only by the scope of the appended claims.

I claim:

1. The method of making a high relief photographic image, which comprises coating a support, in order, with a layer of a barium sulfate friable material, a layer of asphalt, and a light-sensitive gelatin layer, forming a relief image in said gelatin layer by exposure to light and washing away unhardened portions of the gelatin, and removing the asphalt and at least part of the friable material by sandblasting in those parts of the gelatin layer where the gelatin has been removed.

2. The method of making a high relief photographic image, which comprises coating a support, in order, with a layer of a barium sulfate friable material, a layer of asphalt, and a light-sensitive bichromated glue layer containing a dispersion of soft acrylate resin, exposing said light-sensitive layer to light rays to render only portions of said layer water-soluble, washing away the soluble portions of said glue layer, and removing the asphalt and at least part of the friable material by sandblasting in those parts of the glue layer where the glue was removed.

3. The method of making a high relief photographic image which comprises coating a support, in order, with a layer of friable barium sulfate and binder of cellulose ester and thermoplastic resin in a ratio of approximately 20 parts of pigment to 1 part of binder, a layer of asphalt and a light-sensitive bichromated glue layer containing a dispersion of soft acrylate resin, exposing said light-sensitive layer to light rays to render only portions of said layer water-soluble, washing away the soluble portions of said glue layer and removing the asphalt and at least part of the barium sulfate layers by sandblasting in those parts of the glue layer where the glue was removed.

4. In the method of making a photomechanical printing plate, the steps comprising exposing to light rays a photographic element having a support coated in order with a layer of a barium sulfate friable material, a layer of asphalt, and a light-sensitive gelatin layer, forming a relief image in said gelatin layers by washing away portions of the gelatin layer unhardened by the exposure, removing the asphalt and at least part of the friable material by sandblasting in those parts of the gelatin layer where the gelatin was removed, applying a printing metal to the relief image thus formed, and thereafter removing the printing metal from the relief image in the form of a printing plate.

HENRY C. STAEHLE.

REFERENCES CITED

The following references are of record in the file of this patent:

UNITED STATES PATENTS

| Number | Name | Date |
|---|---|---|
| 494,998 | Evans | Apr. 4, 1893 |
| 684,208 | Evans | Oct. 8, 1901 |
| 1,719,554 | Laugel | July 2, 1929 |
| 2,094,025 | Scantlebury | Sept. 28, 1937 |